(12) United States Patent
Notarpietro et al.

(10) Patent No.: US 6,264,869 B1
(45) Date of Patent: Jul. 24, 2001

(54) METHOD OF PREPARING 3-DIMENSIONAL, AESTHETICALLY APPEALING DECORATIVE EMBLEMS

(75) Inventors: Giancarlo Notarpietro, Biassono (IT); Albert Vent, Eschweiler (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/269,389

(22) PCT Filed: Nov. 24, 1997

(86) PCT No.: PCT/US97/21441

§ 371 Date: Jun. 28, 1999

§ 102(e) Date: Jun. 28, 1999

(87) PCT Pub. No.: WO98/23432

PCT Pub. Date: Jun. 4, 1998

(30) Foreign Application Priority Data

Nov. 28, 1996  (EP) .................................................. 96119047

(51) Int. Cl.[7] .................................................. B29C 45/14
(52) U.S. Cl. .......................... 264/247; 264/273; 264/275; 264/250; 264/255; 428/14
(58) Field of Search .................................. 264/247, 273, 264/275, 255, 250; 428/31, 13, 14

(56) References Cited

U.S. PATENT DOCUMENTS

| | | | |
|---|---|---|---|
| 2,298,365 | * 10/1942 | Gits et al. ................................. | 18/61 |
| 4,087,570 | 5/1978 | Beinbrech ............................... | 427/44 |
| 4,139,654 | 2/1979 | Reed ....................................... | 427/44 |
| 4,259,388 | 3/1981 | Reed ....................................... | 428/174 |
| 4,330,578 | 5/1982 | Nishihira et al. ....................... | 428/13 |
| 4,356,617 | 11/1982 | Coscia ................................... | 29/527.4 |
| 4,427,615 | 1/1984 | Eskesen ................................. | 264/261 |
| 4,481,160 | 11/1984 | Bree ....................................... | 264/135 |
| 4,566,929 | 1/1986 | Waugh ................................... | 156/242 |
| 4,708,894 | 11/1987 | Mabuchi et al. ........................ | 428/31 |
| 4,767,642 | 8/1988 | Shimizu et al. ........................ | 427/54 |
| 4,767,674 | 8/1988 | Shirai et al. ........................... | 428/461 |
| 5,472,548 | * 12/1995 | Lindsay et al. ........................ | 156/277 |
| 5,480,688 | * 1/1996 | Kaumeyer .............................. | 428/13 |
| 5,698,276 | * 12/1997 | Mirabitur ............................... | 428/31 |
| 5,965,222 | * 10/1999 | Benzing et al. ........................ | 428/31 |

FOREIGN PATENT DOCUMENTS

| | | |
|---|---|---|
| 0 030 827 | 6/1981 | (EP) . |
| 0 060 721 | 9/1982 | (EP) . |
| 0 465 356 A2 | 1/1992 | (EP) . |
| 0 492 532 | 7/1992 | (EP) . |
| 61-249758 | 6/1986 | (JP) . |
| 62-227609 | 6/1987 | (JP) . |
| WO 94/13497 | 6/1994 | (WO) . |

OTHER PUBLICATIONS

*Encyclopedia of Polymer Science and Engineering*, New York, 1987, vol. 8, p. 102–158.
*Encyclopedia of Polymer Science and Engineering*, New York, 1987, vol. 14, p. 22–100.

* cited by examiner

Primary Examiner—Jan H. Silbaugh
Assistant Examiner—Edmund H. Lee
(74) Attorney, Agent, or Firm—Brian E. Szymanski (57) ABSTRACT

Method of preparing a decorative emblem including providing a rigid substrate having on the front surface a 3-dimensional design having protrusions or recesses; placing the substrate in a first mold having an inner surface which closely contacts part of the substrate front surface to provide a gap between an mold inner surface and a front surface; injection molding a first plastic through one or more conduits extending from the back surface of the substrate to the front surface to fill the gap and solidifying the first plastic material; covering at least part of the 3-dimensional design and the first plastic material with a second transparent plastic to form a protective cap by placing the substrate in a second mold having an inner surface which closely contacts part of the surface of the substrate to provide a cavity into which the second plastic is injected.

9 Claims, 3 Drawing Sheets

METHOD OF PREPARING 3-DIMENSIONAL, AESTHETICALLY APPEALING DECORATIVE EMBLEMS

TECHNICAL FIELD

The present invention relates to a method of preparing decorative elements comprising providing a rigid substrate having on the front surface a 3-dimensional design and covering the 3-dimensional design with a transparent material. The invention furthermore relates to decorative elements which are obtainable by such method and to their use for automotive applications.

BACKGROUND

Decorative elements comprising a rigid or flexible substrate optionally having on the front surface a 3-dimensional design which is covered with a transparent plastic material, are described in literature.

U.S. Pat. No. 4,356,617 describes a decorative emblem using a metal foil as a substrate bearing indicia applied by silk screen or lithographic printing. The metal foil may subsequently be embossed to provide a 3-dimensional design. Then a fluent, viscous plastic material such as a polyurethane is cast onto the optionally embossed indicia which melds together and forms a meniscus which, when hardened, gives a lens effect to the resulting decorative emblem. In order to control the flow of fluent plastic and meniscus formation, a sharply defined peripheral edge such as a dike is formed, for example, during the embossing step or is printed onto the metal foil. The decorative emblem may comprise a layer of a pressure-sensitive adhesive on the back surface of the metal foil to allow for adhering it to the intended surface. The fluent, viscous plastic material may be selected from heat-curable materials such as polyurethanes. Radiation curable materials are, described, for example, in U.S. Pat. No. 4,087,570 or U.S. 4,259,388. U.S. 4,566,929 describes a flexible trim strip suitable for application to an automobile body comprising an elongate molding with a longitudinal channel, a decorative surface in said channel and a weather-resistant and impact-resistant plastic overlay having radiused edges which provide a lens effect to the decorative surface beneath.

U.S. Pat. No. 4,767,674 and U.S. 4,481,160 describe decorative emblems using a bezel having a cavity formed by a generally flat base and vertically upstanding peripheral sidewalls or dikes as a substrate which may be formed of a plastic such as an acrylonitrile-butadiene-styrene (ABS) resin. Subsequently to an initial casting of a fluent plastic material into the cavity, a decorative foil is placed therein and subjected to a second casting of fluent plastic material to form a lens cap over the foil and completely encapsulating it in plastic. The decorative foil may be a metal foil which is brushed, printed, optionally embossed and die-cut to fit into the cavity. The bezel may comprise an adhesive layer on the back surface to attach the resulting decorative emblem to the intended surface.

The decorative ornament described in JP 61-249,758 is obtained by first providing a substrate having protruded parts via injection molding of, for example, polyvinyl chloride or ABS. Then a pigmented polyurethane resin is poured over the protruded parts and cured followed by the application of a curable, transparent synthetic resin that has a meniscus.

U.S. Pat. No. 4,330,578 describes a process for preparing a synthetic resin decorative article comprising first forming a molded piece by injection molding which preferably has a flat surface onto which a designed pattern is printed. The molded piece is then placed into a second mold to form a synthetic resin decorative article consisting essentially of two injection molded, superimposed thermoplastic resin bodies and at least one integral layer of a cured thermosetting ink enclosed within the molded bodies.

U.S. Pat. No. 4,427,615 describes a method for preparing injection molded plastic objects. In this method a foil is inserted into the mold cavity so that the foil is pressed into engagement with the button and/or top of the mold cavity by molding material injected under pressure.

The decorative elements which are available so far, do not fulfill all aesthetic requirements to a desired degree and/or the method of their production can be complicated or expensive. Therefore there has been a need for providing decorative elements which are highly appealing from an aesthetic point of view and a technically and economically acceptable method of preparing them.

DISCLOSURE OF INVENTION

The invention may be summarized as a method of preparing decorative emblems comprising:

(a) providing a rigid substrate (1) having on the front surface (2) a 3-dimensional design having elements (4) which form elevations or recesses with respect to the front surface (2);

(b) placing the substrate in a first mold (6) having an inner surface (7) which closely contacts part of the front surface (2) to provide a gap (8) between the inner surface (7) and other (recessed) parts of the front surface (2);

(c) injection molding a first plastic material (9) through one or more conduits (10) extending from the back surface (5) of the substrate to the front surface (2) to allow for filling the gap with the first plastic material and solidifying or curing the plastic material;

(d) covering at least part of the 3-dimensional design and the first plastic material (9) with a second transparent plastic material (17) to form a protective cap (18) by placing the substrate in a second mold (11) having an inner surface (12) which closely contacts part of the surface (2) of the substrate (1) thus providing a cavity (14) into which the second plastic material (17) is injection molded through one or more conduits (23) extending from the back surface (5) to the front surface (2) or, alternatively, removing the substrate (1) from the first mold (6) and casting a measured amount of the second plastic material (17) onto the first plastic material (9) and the 3-dimensional design.

The invention furthermore comprises a decorative element which is obtainable by such method and to the use of the decorative emblem for automotive applications.

BRIEF DESCRIPTION OF THE DRAWINGS

FIG. 6 is a schematic top view of an oval shaped bezel 19 having a vertically extending, peripheral rim 21 surrounding recess 20. The front surface 2 comprises a 3-dimensional design of elements 4 marking the word "Symbol". The front surface which is at least partly covered between the elements 4 with the first plastic material 9, is attached with a dispenser means having a plurality of dispenser orifices 24 through which the second transparent plastic material 17 is conveyed covering the 3-dimensional design of elements 4 and the first plastic material 9 and forming a protective cap 18.

DETAILED DESCRIPTION

The decorative elements according to the present invention comprise a rigid substrate 1 which may be formed of thermoplastic or thermosetting polymer materials such as, for example, acrylonitrile-butadiene-styrene (ABS), acrylonitrile-styrene-rubber copolymers (ASA), polycarbonates, polyamides or epoxy resins or a metal or metal alloy such as zinc, aluminum or stainless steel. Plastic type substrates may be metallized or metal-plated with, for example, chrome or aluminum.

Figure 1:
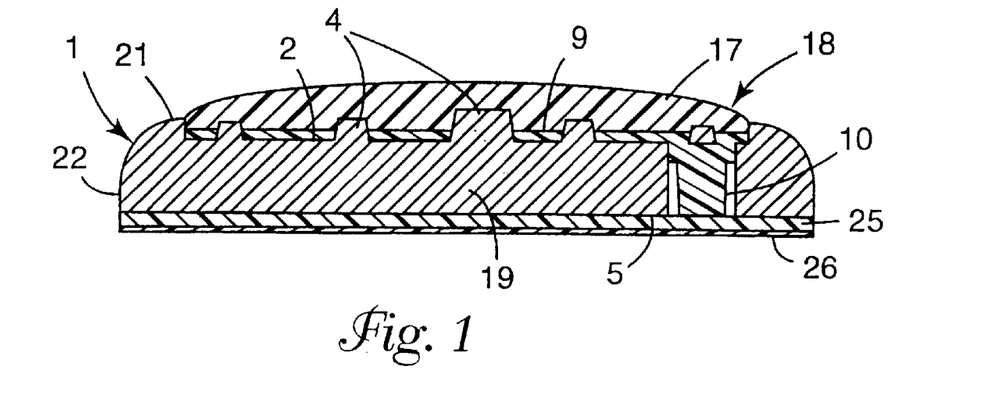
FIG. 1 is a schematic cross-sectional view of a preferred embodiment of a decorative element according to the invention comprising as a substrate a bezel 19 with a vertically extending, peripheral rim 21, having on the front surface 2 a 3-dimensional design with elements 4. The first plastic material 9 which has been injection molded via conduit 10, is located on the front surface of the bezel 19 between elements 4. The second transparent plastic material 17 covers the embossed design of elements 4 forming a lens cap 18. The back surface 5 of bezel 19 comprises an adhesive layer 25 with a release liner 26.

The substrate 1 comprises a front surface 2, a back surface 5 and an edge or edges 22. The front surface 2 exhibits a 3-dimensional, ornamental design comprising elements 4. The elements 4 which may form elevations or recesses with respect to a suitably defined reference level of the front surface 2, typically have an average height of between 1/5 and 5, preferably of between 1/3 and 3 and more preferably of between 1/2 and 2 times the thickness of the substrate which is defined as the distance between such level of the front surface 2 and the back surface 5. A suitable reference level of the front surface of the decorative element of FIG. 1 is, for example, the base level connecting the lower ends of the elevations. The elements 4 preferably have an average height of between 0.5 and 6 mm and more preferably of between 1 and 4 mm. The average height of the elements is defined as the absolute average height of elements with respect to said level of the front surface.

The elements may exhibit various shapes and exhibit, for example, essentially trapezoid, rectangular, triangular, circular or more complicated regular or irregular cross-sections. It is, however, preferred that the elements do not exhibit clear-cut or right angle edges in order to allow for a homogeneous metallization and for a smooth flow of the second transparent plastic material 17 essentially free of turbulence when casting or injection molding it. In case of the trapezoidal shaped elements 4 of FIG. 1, the radii of curvature at the upper edge and the bottom of the elements should be at least 0.2 mm and more preferably at least 0.5 mm.

The aesthetic appearance of the finally obtained decorative emblem can be varied widely by varying the geometrical shape of the elements 4, the ratio of elevations and recesses and the average height of the elements 4 and the distribution of the heights of elevations and recesses. 3-dimensional designs which essentially comprise elevations are preferred.

Figure 2:
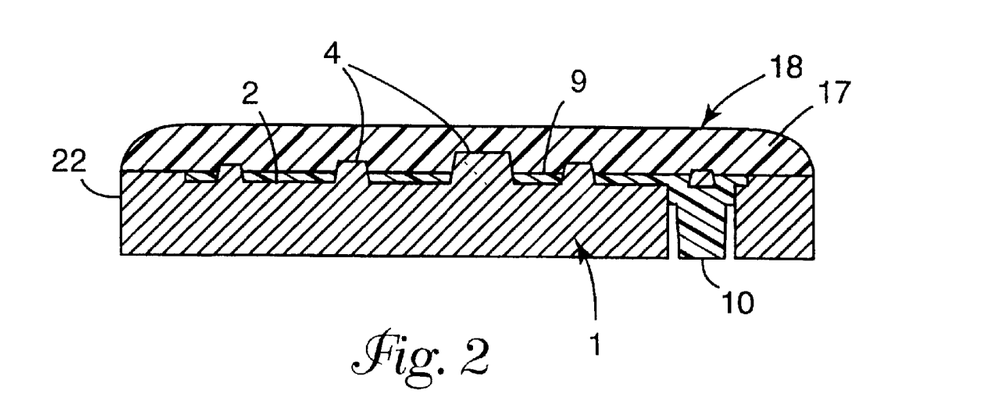
FIG. 2 is a schematic cross-sectional view of another preferred embodiment of a decorative emblem according to the invention comprising a substrate 1 having a clear cut edge 22 and a 3-dimensional design of elements 4 on its front surface 2. The first plastic material 9 which has been injection molded via conduit 10, is located on the front surface of substrate 1 between the elements 4. The second plastic material 17 covers the 3-dimensional design of element 4 forming a lens cap 18.
Figure 3:
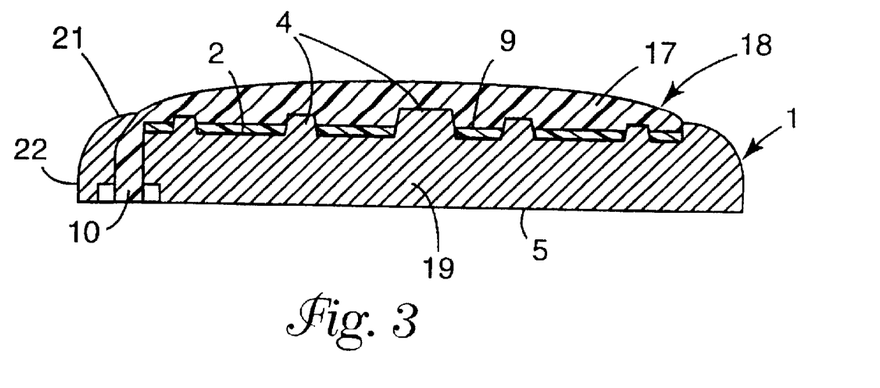
FIG. 3 is a schematic cross-sectional view of another preferred embodiment of a decorative element which is similar to the embodiment of FIG. 1 but wherein the bezel 19 exhibits a curved front surface 2.

The reference level of the front surface 2 of the substrate may be essentially planar as shown in the embodiments of FIGS. 1 and 2 or exhibit a curvature as shown in the embodiment of FIG. 3 or another topography. In case the second transparent polymer 17 is cast as a fluent, viscous material the front surface preferably is essentially planar whereas in case of injection molding of the second polymer 17 any topography of the front surface 2 can be used.

Figure 6:
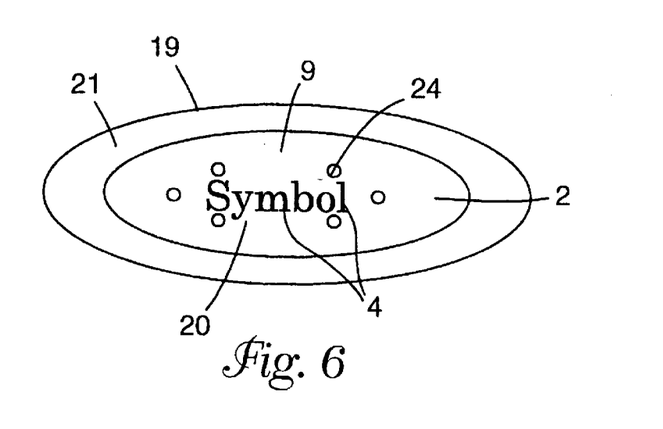

The substrate 1 comprises an edge or edges 22 which are preferably designed to provide a well defined peripheral side of the protecting cap or layer 18 of the second transparent polymer 17. In case the second transparent polymer 17 is cast as a fluent, viscous material the edge preferably is a peripheral, vertically extending rim or dike 21. The resulting substrate is usually termed as a bezel 19 comprising a recess 20 surrounded by the dike 21. The recess 20 is shown in FIG. 6. The dike supports controlling the flow of fluent plastic, material 17 and formation of an outwardly curved or lens surface of the protecting cap. The curvature is generated by the surface tension of the second fluent, viscous transparent polymer 17 during dispensing. The recess 20 has a depth of typically from 1 to 6 mm.

It is also possible to use a clear-cut edge or edges 22 if the second transparent polymer 17 is applied as a viscous fluent material as is shown in the embodiment of FIG. 2.

Figure 5:
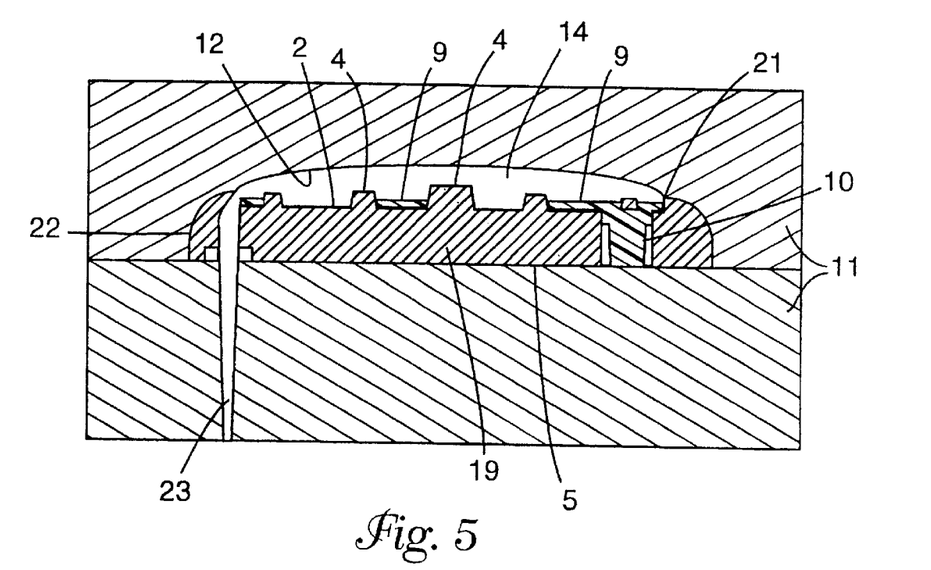
FIG. 5 is a schematic cross-sectional view of a bezel 19 with a vertically extending peripheral rim 21 being placed in the second mold 11. The bezel exhibits on its front surface 2 a 3-dimensional design of elements 4. The first colored plastic material 9 which has been injection molded via conduit 10, partly covers the front surface 2 of the bezel 19 between the elements 4. The second mold 11 has an inner surface 12 which closely contacts the bezel 19 thus providing a cavity 14 into which the second transparent plastic material can be injected via conduit 23.

In case the second transparent polymer 17 is injection molded any curvature, of the outward surface of the cap 18 of polymer 17 can be obtained by using a mold 11 with an appropriately shaped inner surface 12. FIG. 5 shows a mold 11 which is designed to create a lens shape cap 18 of polymer 17. Injection molding of the protective cap or layer 18 thus allows one to vary the design of cap 18 widely and is preferred from an aesthetic point of view.

Substrates 1 comprising plastic materials are preferably obtained by injection molding or reaction injection molding using conventional techniques and processes described, for example, in *Encyclopedia of Polymer Science and Engineering,* New York, 1987, vol. 8, p. 102–158 and vol. 14, p. 22–100. Injection molding of thermoplastic polymers is preferred whereby the plastic material is injected in molten form and subsequently solidified by cooling. Reaction injection molding (RIM) can also be used, for example, wherein solidification results from curing the injected precursor in the mold. Plastic-type substrates can be metallized or metal-plated, for example, with chrome or aluminum. Substrates comprising bulk metal can be obtained by conventional metal cutting technology, for example.

The back surface 5 of the substrate 1 is preferably planar but can also be designed to fit snugly to the surface to which it is to be attached.

In the next step b) of the method according to the invention the substrate 1 is placed in the mold 6 whereby the inner surface 7 of the upper part of the mold 6 contacts at least part of the surface 2 of the substrate to provide a gap 8 which is subsequently filled with the first plastic material 9. The gap 8 preferably is a closed cavity but it can be, for example, also laterally open to allow for free peripheral flowing of the first plastic material 9.

Figure 4:
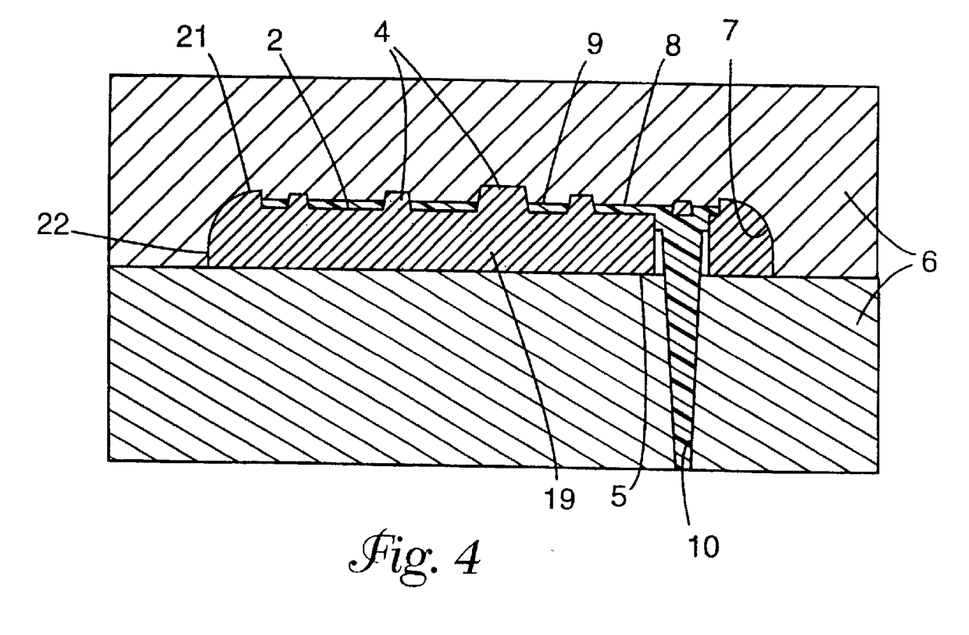
FIG. 4 is a schematic cross-sectional view of a bezel 19 with a vertically extending peripheral rim 21 being placed in the first mold 6 having an inner surface 7 which closely contacts part of the front surface 2 of the bezel 19 thus providing a gap 8 between the inner surface 7 and the front surface 2 of bezel 9.

FIG. 4 schematically visualizes this step of the method according to the invention for a bezel 19. The inner surface 7 of the upper part of the mold 6 closely contacts the rim 21 and the upper ends of the elements 4 thus providing a uniform gap throughout the recess 20 of the front surface 2 which is surrounded by the rim 21. The thickness of the gap is in this embodiment smaller than the height of the elements 4. The recess is shown but not marked by a number in FIG. 1.

The design of the inner surface 7 of the upper part of the mold 6 can, however, be varied to allow for a variation of the thickness of the gap over the front surface 2 of the substrate 1. The thickness of the gap may vary, for example, between adjacent elements 4 of the 3-dimensional design or even within a section defined by two adjacent elements 4.

In case the elements 4 are recesses the average thickness of the gap 8 preferably varies between $\frac{1}{10}$ of the height and the height of the recesses and more preferably between $\frac{2}{10}$ and half the height of the recesses. If the elements 4 are elevations, the thickness of the gap 8 may exceed the height of the elevations and can vary, for example, between $\frac{1}{10}$ of the height and twice the height of the elevations. The thickness of the gap 8 preferably is smaller than the height of the elevations and more preferably varies between $\frac{1}{8}$ and $\frac{7}{8}$ of the height of the elevations. The average thickness of the gap preferably is between 0.4–3 mm.

The method according to the present invention thus allows a broad variation of the 3-dimensional design of the substrate 1 and the 3-dimensional structure of the first plastic material which can be fully utilized by the designer to create aestheticly highly appealing decorative elements.

The gap 8 is filled with the first polymer material 9 which is injection molded via one or more conduits 10 extending from the front surface 2 to the outer surface of the lower part of the mold 6.

The term "first polymer or plastic material" refers to the polymer material which is filled into the gap 8 during step b) of the present invention. The first polymer material 9 may comprise one or more polymer compositions which are injected simultaneously or subsequently to create multicolor decorative emblems.

The polymer compositions used for the first plastic material 9 preferably comprise one or more thermoplastic polymers such as, for example, acrylonitrile-butadiene-styrene (ABS), acrylonitrile-styrene-rubber copolymers (ASA), poly(meth)acrylates or polyamides. The polymer compositions used for the first plastic material 9 may also be based on a reaction molding (RIM) system and comprise, for example, the curable precursor of an epoxy resin.

In order to create an aestheticly appealing decorative emblem the polymer compositions used for the first plastic material preferably comprise dyes and/or pigments in an amount of up to 5% by weight with respect to the mass of the thermoplastic polymer or polymers. The amount of the dyes and/or pigments preferably is between 0.1 and 1% by weight. The addition of dyes and/or pigments, for example, can be omitted in case the substrate is colored and/or in case a specific design is to be obtained.

The first plastic material 9 can comprise other additives such as, for example, antioxidants, UV-stabilizers or lubricants.

In case the first polymer material comprises only one polymer composition, it is preferably selected to exhibit an aestheticly appealing contrast with the 3-dimensional design of elements 4. The 3-dimensional design may be, for example, metallized and the first polymer material comprises dyes and/or pigments, it is, however, also possible that the substrate 1 with the 3-dimensional design comprises a colored polymer composition.

In case of multicolor designs the first polymer material comprises at least two polymer compositions which may be injected into gap 8 simultaneously or subsequently. If they are filled in simultaneously the polymer compositions which are, for example, differently colored merge or feather prior to solidification or curing thus creating an aestheticly highly appealing design.

It is also possible that a first polymer composition is filled into a first gap 8 which is defined by a first inner surface 7 of the upper part of the mold 6. The first polymer composition is then solidified or cured and the substrate is then ejected from the first mold 6 to be inserted into a second mold 6 the inner surface of which defines a second gap 8 which is then filled with the second polymer composition.

After curing and/or solidification of the second polymer composition a third polymer composition may be injected and so on. This technique allows the preparation of multicolor 3-dimensional decorative elements which are aestheticly highly appealing.

The number and positioning of conduits 10 depends on the number of polymer compositions to be injected. For each injection step, one or more conduits 10 are required. The number and positioning of the conduits for the individual injection steps is selected to provide a steady filling of the gap 8 avoiding the formation of turbulence or air inclusions. The substrate may comprise channels connecting parts of the 3-dimensional design separated by elements 4 to allow for flowing of the first polymer material beneath the 3-dimensional design. Substrates having a maximum lateral extension of not more than about 10 cm and requiring a single-color filling are preferably filled, for example, via one or two, more preferably one conduit 10 while the filling process is preferably further supported by channels. The person skilled in the art can design more complicated filling patterns in case of larger or multicolored decorative emblems.

The air to be displaced from gap 8, can typically escape via the small gap between the inner surface 7 of the upper part of the mold 6 and the substrate 1 and the small gap between the upper and lower part of the mold 6, but it is also possible to provide a vent conduit extending from the surface 2 of the substrate 1 to the outer surface of the lower part of the mold 6. The optional vent conduit is not shown in FIG. 4.

Injection molding of a thermoplastic first polymer material 9 is preferred. The material 9 is injected under suitable flow conditions to allow for steady and uniform filling of the gap to avoid any inclusion of air and to prevent the polymer material from overflowing elements 4.

The temperature of the mold 6 is controlled to maintain the injected first polymer 9 in a fluid condition when filling the gap 8. The process parameters of the injection molding step mainly depend on the geometrical dimensions and the design of the mold and on the properties of the first polymer material. The temperature of the mold 6 may often be chosen to be between 50 and 100° C. and more preferably between 60 and 80° C. The viscosity of the first plastic material 9 is typically between about 10 and $1 \times 10^4$ Pascal seconds and more preferably between about $1 \times 10^2$ and $1 \times 10^3$ Pas.

Although the mold 6 shown in FIG. 4 comprises 2 rectangular parts with the substrate 1 being completely located in one half, it is not always necessary that the mold 6 have such a shape.

The diameter of the conduit or conduits 10 and the injection pressure are selected to provide a steady and slow flow of the injected first plastic material 9 into the gap 8 in order to avoid formation of any air inclusions and/or turbulences. For substrates having a maximum lateral extension of not more than about 10 cm the filling rate is, for example, typically 100 cm³/s or less and more preferably 50 cm³/s or less.

The thermoplastic is melted by heating to temperatures of typically up to 260° C. and more preferably of between 200 and 250° C. and injection molded via conduits 10 into the gap 8.

The plastic material 9 is then solidified by cooling and the resulting article is ejected from the mold 6. During the cooling step shrinkage of the plastic material 9 is usually observed which, in particular, may result in cracks at the interface of elements 4 and first plastic material 9. The formation of cracks is undesirable and can be suppressed by selecting first polymer materials 9 with a low coefficient of shrinkage of preferably not more than 0.6 vol. %. The shrinkage behavior of the first polymer material 9 can furthermore be advantageously influenced by applying a low cooling rate. The cooling rate can be decreased by increasing the temperature of the mold. The formation of cracks can furthermore be suppressed by increasing the pressure exerted onto the article in the mold during the cooling step and/or increase the diameter of conduits 10.

After the article comprising the substrate 1 and the solidified layer of the first plastic material 9 has been ejected from the mold 6, the second plastic material 17 is applied to form a protective cap 18 covering the 3-dimensional design of elements 4 and the first plastic material 9. The term protective cap 18 indicates that the distance between the average upper end of the elevations of the 3-dimensional design and the outer surface of the protective cap 18 preferably is at least 1 mm and more preferably at least 15 mm.

The cured second plastic material 17 is a transparent polymer to allow for viewing the 3-dimensional design. It is preferably weather-resistant and does not yellow or cloud as a result of prolonged exposure to sunlight and withstands detergents. It furthermore preferably is resistant to abrasion and impact.

The second plastic material preferably is a one- or multi-component polyurethane material that can be applied as a curable precursor with subsequent curing by heating, UV radiation, RF heating or by drying in ambient air or as a molten polymer material with subsequent solidification by cooling. Many of the known polyurethanes derived from polyalcohols and polyisocyanates can be used in the present invention. Preferred are, for example, polyurethanes comprising the reaction product of polypropylene glycol and an aliphatic diisocyanate. Another preferred polyurethane is obtained as the reaction product of a polycaprolactam triol and an aliphatic diisocyanato-polycaprolactam diol adduct.

It is furthermore advantageous to use a polyurethane comprising the reaction product of (A) a mixture of a polyester glycol and a polypropylene triol having a low or medium molecular weight, and (B) an aliphatic diisocyanate polypropylene triol added. In another preferred embodiment a relatively soft, flexible, weather-resistant polyurethane having a shore D hardness in the range of about 10 to 80, more preferably 45–65 is used.

Other transparent materials such as acrylic or epoxy resins, and blends such as polyurethane/acrylic blends and polyurethane/epoxy blends can be used as well. Other materials which are useful as the second plastic material are described, for example, in U.S. Pat. No. 4,708,894, U.S. 4,139,654, U.S. 4,566,929, U.S. 4,767,642 or WO 94/13,497 and the references cited therein.

The second plastic material 17 can be applied as pourable, fluent, viscous material by coating, casting or spraying, for example. The viscosity of the precursor of the second plastic material preferably is not higher than 1,000 mPas at 50° C.

The second fluent, viscous plastic material 17 is preferably applied with a dispensing device having orifices 24 which are located on the substrate to allow for the formation of a uniform cap free of any air inclusions. FIG. 6 shows a preferred arrangement of orifices to provide a protecting cap for an oval shaped bezel 19 having a vertically extending peripheral rim. The second fluent, viscous plastic material is cast via orifices 24 into the recess 20 of the bezel 19 which comprises a 3-dimensional design of elements 4 marking the word "Symbol" and is partly or fully covered between the elements 4 with the first plastic material 9.

Another suitable design of a dispensing device is described, for example, in U.S. Pat. No. 4,356,617. The diameter of the orifices and the dispensing speed are preferably selected to allow for a slow application of the protecting cap of polymer 17 in order to avoid turbulence of flow and/or formation of air inclusions. The time required for applying the protecting cap typically is between 2 and 4 seconds.

The amount and viscosity of the fluent viscous second plastic material 17, the design of the dispensing device and the dispensing speed, the form of the edge 22 of the substrate and the topography of the surface of the first plastic material are preferably selected so that the cured second polymer material 17 forms a curved or lens shape on its outer surface oriented to the viewer.

FIGS. 1 and 2 are schematic cross-sectional views of preferred embodiments of decorative emblems according to the invention which are obtainable by applying a fluent, viscous second polymer material 17. The decorative emblem of FIG. 1 comprises a bezel 19 with a vertically extending, peripheral rim which supports the formation of lens shape caps. The curvature is generated by the surface tension of the fluent, viscous second polymer material 17. As indicated in FIG. 1, the envelope connecting the upper surfaces of the elements 4 of the 3-dimensional design may optionally be adjusted to the surface of the resulting lens shape cap. The decorative emblem of FIG. 2 comprises clear-cut edges 22 which supports formation of a cap exhibiting a curvature only at the edges whereas the remaining regions of the surface of the cap are essentially planar.

The person skilled in the art can vary the parameters mainly influencing the shape and curvature of the cap of the second polymer material 17 to obtain a desired surface. The curvature of the cap is due to the surface stresses inherent in the fluent, viscous second plastic material 17. The curvature can also be provided or modified or surface topographies other than curvatures can be provided by post-machining the transparent layer.

In an alternative method of preparation which is preferred, the second plastic material 17 can also be applied via injection molding or reaction injection molding. As is shown schematically in FIG. 5 for a bezel 19 comprising a vertically extending, peripheral rim 21, the article comprising the bezel 19 and the solidified layer of the first plastic material 9, is inserted into a second mold 11 having an inner surface 12. The shape of the inner surface 12 which closely contacts the bezel 19 to provide cavity 14, can be varied widely to provide cavities 14 and hence caps of the second polymer 17 with different shapes. The second transparent material is injected via one or more conduits 23 extending from the surface of the lower part of mold 11 to the surface 2 of the bezel above the surface of the first plastic material 9.

Depending on the nature of the second plastic material 17, it can be filled into cavity 14 via injection molding or reaction injection molding.

Thermoplastic materials such as polyurethanes, polycarbonates or polyacrylates arc preferably processed via injection molding. The temperature of the mold 11 is controlled to maintain the injected second polymer 17 in a fluid condition when filling the cavity 14. The process parameters of the injection molding step mainly depend on the geometrical dimensions and the design of the mold and on the properties of the second polymer material 17. The temperature of the mold 11 is often chosen to be between 20 and 100° C. The viscosity of the second plastic material 17 is preferably between about 10 and $1\times10^4$ Pas and more preferably between about $1\times10^2$ and $1\times10^3$ Pas.

The diameter of the conduit or conduits 23 and the injection pressure are selected to provide a steady and slow flow of the injected second plastic material 17 into the cavity 14 in order to avoid formation of any air inclusions. The filling rate preferably is 100 cm$^3$/s or less and more preferably 50 cm$^3$/s or less.

The second injected thermoplastic polymer 17 is solidified by cooling and the decorative emblem is ejected from the mold.

In case of a thermosetting second polymer material 17 such as epoxy resins, a. curable precursor is injected into the mold 11. The temperature of the mold 11 is adjusted to allow for curing of the curable precursor in typically 15–25 seconds. The viscosity of the curable resin typically is chosen to be between 1,000–5,000 mPas. The decorative emblem is ejected from the mold after curing.

To attach the decorative emblems according to the invention to a substrate it is usually required that an adhesive layer be applied to the back side 5 of the substrate 1 although other fastening means, in particular mechanical fastening means, can be used as well. In a preferred embodiment the back side 5 of substrate 1 is provided with an adhesive layer 25 which is protected by a release liner 26 as is schematically shown in FIG. 1. By removing release liner 26, adhesive layer 26 is exposed so that decorative emblem can be adhered to the substrate or surface to be decorated.

The method for preparing decorative elements according to the present invention and the decorative elements obtained by such method exhibit several advantages:

The method of the present invention allows for the preparation of one-part decorative elements whereas previous methods often required inserting an optionally embossed metal foil into a bezel followed by the application of one or more polymers.

The method according to the present invention provides an essentially unlimited freedom of design. The designer can vary and adjust the 3-dimensional design of the substrate 1 and of the gap 8 to be filled with the first polymer material 9. He or she can select any desirable contrast between the substrate 1 and the first polymer material and create single or multicolor designs. This broad spectrum of possibilities of design was not accessible in prior art.

In a preferred method of the present invention the lens cap is obtained via injection molding so that a wide variety of cap shapes can be obtained. The cap shape is obtained in a very reproducible way. The surface of the cap is typically very smooth so that no post-machining is required.

The method according to the invention can therefore be used to reproducibly prepare 3-dimensional, aestheticly highly appealing decorative, elements with an excellent surface finish. A preferred field of application for the 3-dimensional decorative elements is the automotive industry where, for example, the manufacturer's badges or elongate trim strips on the sides of car bodies can be decorative elements of the present invention.

What is claimed is:

1. A method of preparing a decorative emblem comprising:
    (a) providing a rigid substrate having a front surface, a back surface, and 3-dimensional design elements that form elevations in the front surface, wherein the 3-dimensional design elements are formed by part of the rigid substrate;
    (b) placing the substrate in a first mold having an inner surface which closely contacts part of the front surface to provide a gap between the inner surface of the first mold and parts of the front surface recessed with respect to elevated portions of the front surface;
    (c) injection molding a first plastic material through one or more conduits extending from the back surface of the substrate to the front surface of the substrate to allow for filling the gap with the first plastic material and allowing the first plastic material to solidify or cure; and
    (d) covering at least part of the 3-dimensional design elements and the first plastic material with a second plastic material that is transparent to form a protective cap having an outer surface by placing the substrate in a second mold having an inner surface which closely contacts part of the front surface of the substrate thus providing a cavity into which the second plastic material is injection molded through one or more conduits extending from the back surface of the substrate to the front surface of the substrate.

2. The method according to claim 1 wherein the substrate is a bezel having a recessed front surface and 3-dimensional design elements that form elevations in the front surface and surrounding the recessed front surface is a vertical rim.

3. The method according to claim 1 wherein the substrate comprises materials which are selected from the group consisting of metals, metal alloys and plastics selected from acrylonitrile-butadiene-styrene, acrylonitrile-styrene-rubber copolymers, polycarbonates, polyamides, epoxy resins and mixtures thereof.

4. The method according to claim 3 wherein the substrate comprises a plastic material which is metallized prior to inserting the substrate into the first mold.

5. The method according to claim 1 wherein the 3-dimensional design elements have an average height above the front surface of between 0.5 and 6 mm.

6. The method according to claim 1 wherein the first plastic material is selected from the group consisting of acrylonitrile-butadiene-styrene (ABS), acrylonitrile-styrene-rubber compositions (ASA), poly(meth)acrylates, polyamides, and epoxy resins.

7. The method of claim 1 wherein the second plastic material is selected from the group consisting of polyurethanes, polycarbonates, poly(meth)acrylates, epoxy resins and mixtures thereof.

8. The method of claim 1 wherein a sufficient quantity of the second plastic material is used such that the decorative emblem has a distance of at least 1 mm between the outer surface of the protective cap and an average upper end of the 3-dimensional design elements.

9. The method according to claim 1 wherein the 3-dimensional design elements form letters or characters and the first plastic material provides a background.

* * * * *

UNITED STATES PATENT AND TRADEMARK OFFICE
CERTIFICATE OF CORRECTION

PATENT NO. : 6,264,869 B1
DATED : July 24, 2001
INVENTOR(S) : Giancarlo Notarpietro and Albert Vent Page 1 of 1

It is certified that error appears in the above-identified patent and that said Letters Patent is hereby corrected as shown below:

<u>Title page, Item [54], and Column 1, lines 2 and 3,</u>
Title, "APPEALING DECORATIVE" should read -- APPEALING, DECORATIVE --

<u>Column 3,</u>
Line 19, "bezel 9" should read -- bezel 19 --;

<u>Column 6,</u>
Line 12, "pigments, it is," should read -- pigments. It is, --;

<u>Column 9,</u>
Line 20, "arc" should read -- are --; and
Line 42, "a. curable" should read -- a curable --.

Signed and Sealed this

Sixteenth Day of April, 2002

Attest:

JAMES E. ROGAN
*Director of the United States Patent and Trademark Office*

*Attesting Officer*